United States Patent

Torii et al.

Patent Number: 5,368,934
Date of Patent: Nov. 29, 1994

[54] COMPOSITE MATERIALS

[75] Inventors: Takayoshi Torii, Ichikawa; Minoru Sugita, Minato; Toshiyuki Tachikawa, Fujieda, all of Japan

[73] Assignees: Shimizu Corporation; Yamato Refractories & Co., Ltd., both of Japan

[21] Appl. No.: 92,934

[22] Filed: Jul. 19, 1993

Related U.S. Application Data

[63] Continuation of Ser. No. 703,775, May 21, 1991, abandoned.

[30] Foreign Application Priority Data

May 21, 1990 [JP] Japan ................. 2-130570

[51] Int. Cl.$^5$ ............ C08G 8/04; D02G 3/00
[52] U.S. Cl. ................. 428/372; 428/367; 428/373; 428/378; 428/395; 428/396; 428/408; 528/160
[58] Field of Search .......... 428/364, 367, 372, 373, 428/375, 395, 378, 396, 408, 703; 528/160

[56] References Cited

U.S. PATENT DOCUMENTS

| | | | |
|---|---|---|---|
| 3,508,990 | 4/1970 | Marzocchi | 428/396 |
| 3,533,830 | 10/1970 | Marzocchi et al. | 428/396 |
| 3,839,270 | 10/1974 | Wilkinson et al. | 524/4 |
| 4,277,535 | 7/1981 | Girgis | 428/389 |
| 4,314,003 | 2/1982 | Curnow et al. | 428/294 |
| 4,762,751 | 8/1988 | Girgis et al. | 428/378 |
| 4,876,143 | 10/1989 | Sugita et al. | 428/294 |
| 5,026,410 | 6/1991 | Pollet et al. | 65/3.43 |
| 5,114,653 | 5/1992 | Scuerhoff et al. | 264/228 |
| 5,122,417 | 6/1992 | Murakami et al. | 428/371 |

FOREIGN PATENT DOCUMENTS

| | | |
|---|---|---|
| 59-221351 | 12/1984 | Japan . |
| 60-35047 | 2/1985 | Japan . |

Primary Examiner—Jenna L. Davis
Assistant Examiner—Blaine Copenheaver
Attorney, Agent, or Firm—Wenderoth, Lind & Ponack

[57] ABSTRACT

A composite material wherein a mixture of a phenolic or furan resin and an inorganic filler as matrix materials is incorporated in an inorganic fiber or heat-resistant organic fiber in the form of a long fiber bundle. The composite material has excellent characteristics such as heat resistance, strength and alkali resistance. The present invention can provide substitutes used in place of concrete reinforcing steel bars or steel frames which can be used in structures for building and civil engineering.

1 Claim, 1 Drawing Sheet

COMPOSITE MATERIALS

This application is a continuation of now abandoned application, Ser. No. 07/703,775, filed May 21, 1991, now abandoned.

BACKGROUND OF THE INVENTION

This invention relates to a novel composite material, and more particularly to a composite material for construction structures which has excellent strength, heat resistance and alkali resistance and which is suitable for use as substitutes of reinforcing steel bars for concrete structures or of strands for prestressed concrete structures.

Generally, concrete structures are reinforced by steel bars. In recent years, sea sand having a high salinity has been increasingly used in place of pit sand in preparing a concrete. However, the salinity gradually corrodes the reinforcing steel bars to deteriorate its strength and thus the durable period is reduced.

There is a continued need to use substitutes for concrete reinforcement in place of the reinforcing steel bars. In recent years, substitutes have been developed. It is desirable that the substitutes exhibit the following characteristics. First, the substitutes have high alkali resistance such that they withstand an alkali in a concrete. Secondly, the substitutes have high strength, and preferably have light weight and high strength. Thirdly, the substitutes have high heat resistance, and thus they neither ignite nor burn even if the concrete structure is surrounded by a severe flame and the explosive fracture of the structure occurs eventually to expose the substitutes.

This is also true in the cases of strands for prestressed concrete structures or substitutes thereof. The foregoing is also true in the case of substitutes for steel frames. Interior finishing materials and exterior finishing materials having durability and light weight are demanded.

In recent years, fibers having high performance and high strength such as carbon fibers have been developed. Such fibers have been used in the field of a construction in order to obtain fiber-reinforced composite materials wherein they have light weight, good workability and productivity, wherein the weight of the structure can be reduced and wherein durability can be further improved. However, the fiber-reinforced composite materials heretofore proposed lack heat resistance and the like, they do not combine the characteristics described above and they cannot be used in general practice.

For example, Japanese Patent Laid-Open Pub. No. 146024/1989 discloses a concrete structure obtained by forming fibers such as carbon fibers and glass fibers with resins such as vinyl ester resins and epoxy resins to make a material and using the material as a substitute of a reinforcing steel bar. However, such a material has insufficient heat resistance. For example, when the material is exposed to high temperatures of at least 300° C., it ignites and gradually becomes porous. Thus, this allows the combustion of a volatile matter of resins, and carbonization occurs. Accordingly, the material does not satisfy the requirements of a building code. Such a material is only applied to structures for civil engineering requiring less heat resistance.

Japanese Patent Laid-Open Pub. Nos. 215634/1986 and 121450/1989 disclose concrete-reinforcing materials obtained by forming carbon fibers with resins such as furan-modified epoxy resins. However, these materials lack heat resistance and exhibit insufficient alkali resistance.

SUMMARY OF THE INVENTION

It is an object of the present invention to provide a composite material having excellent heat resistance (it neither ignites nor burns even if it is exposed to a flame having high temperatures of at least 300° C.) and exhibiting excellent strength and alkali resistance. We have now found that such an object is achieved by a composite material wherein a mixture of a phenolic resin or a furan resin and an inorganic filler as matrix materials is incorporated in an inorganic fiber or heat-resistant organic fiber in the form of continuous fiber rovings.

DETAILED DESCRIPTION OF THE INVENTION

Figure 1:
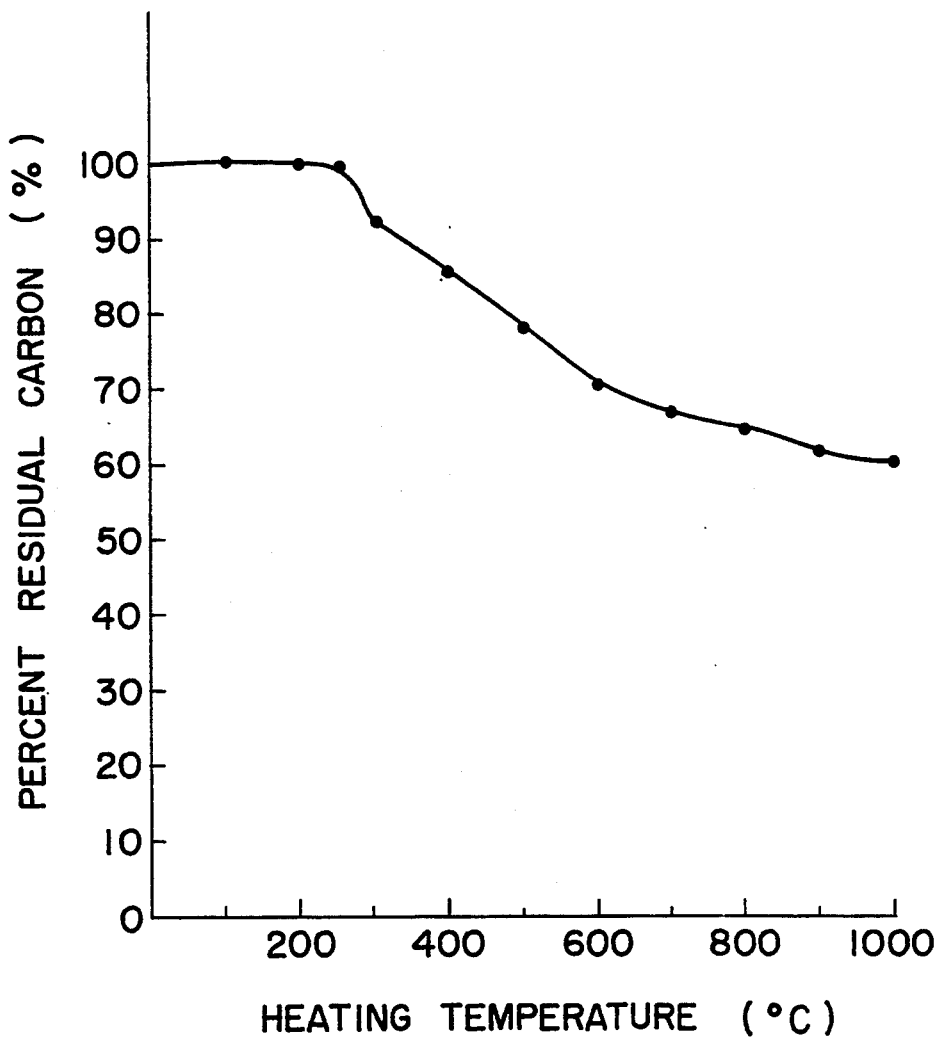
FIG. 1 shows the change of the percent of residual carbon of fibers and fillers at a high temperature.

The present invention will be described in detail.

Fibers used in the present invention are inorganic fibers or heat-resistant organic fibers in the form of a continuous fiber rovings. The fibers which can be used are selected from glass fibers, carbon fibers, alumina fibers, aramid fibers, and mixtures thereof.

The glass fibers have a diameter of from 5 to 25 micrometers. Usually, about 50–5,000 filaments of glass fiber are bundled to form a roving and about 5–100 rovings are integrated into a predetermined shape. It is preferred to previously coat the glass fibers with a silane coupling agent such as TSL-8331 manufactured by Toshiba Silicone Co., Ltd. or KBM 603 manufactured by Shin-etsu Silicone Co., Ltd. in order to obtain a wettability of the glass fibers with resins, a bonding property between the glass fibers and the resins, and strength.

About 3,000–12,000 filaments of carbon fibers having a diameter of from about 3 to 10 micrometers are bundled to form a tow and this tow is used. When the carbon fibers are graphitized, a highly refractory product is obtained.

Concerning with the alumina fibers, a product commercially available from Mitsui Mining Co., Ltd. under the tradename Almax is preferably used. This product is composed of a bundle comprising 1000 filaments of fiber and has 99.5% of $Al_2O_3$, tensile strength of 180 kg/mm$^2$ and a fiber diameter of 10 micrometers. The commercial product is fibers having a high refractoriness.

In addition to these inorganic fibers, aramid fibers commercially available from E. I. du Pont de Nemours & Co. under the tradename Kevlar can be also preferably used as heat-resistant organic fibers in the present invention.

These fibers can be used alone or in combination. For example, the glass fibers can be used in combination with the carbon fibers.

Specification of various fibers used in the present invention is summarized as follows.

| Type of Fiber | Glass | Carbon | Alumina Continuous Fiber | Kevlar |
| --- | --- | --- | --- | --- |
| Fiber Diameter (μ) | 22 | 7 | 10 | 11.9 |

-continued

| Type of Fiber | Glass | Carbon | Alumina Continuous Fiber | Kevlar |
|---|---|---|---|---|
| Bulk Specific Gravity | 2.54 | 1.77 | — | 1.45 |
| Tensile Strength (kg/mm$^2$) | 200 | 350 | 180 | 280 |
| Component | SiO$_2$ 54<br>Al$_2$O$_3$ 15<br>CaO 15<br>B$_2$O$_3$ 5 | C 99 | Al$_2$O$_3$ 99.5 | |
| Roving | 2,300 | 12,000 | 1,000 | 11,400 |
| Tensile Strength of Roving calculated from Cross-Sectional Area (Kg) | 174 | 161 | — | 335 |

A mixture of a phenolic resin or a furan resin and an inorganic filler is used as matrix forming materials for the inorganic fibers or heat-resistant organic fibers in the form of continuous fiber rovings in the present invention.

The phenolic resins used in the present invention are obtained by reacting phenols such as phenol, cresol and dimethylphenol with aldehydes such as formaldehyde, paraformaldehyde and benzaldehyde in the presence of an acid or base catalyst. The phenolic resins can be modified with modifiers such as various alkylphenols, animal oils and vegetable oils. When so-called resol-type phenolic resins obtained by using an alkali catalyst such as sodium hydroxide, potassium hydroxide, calcium hydroxide or barium hydroxide, or an amine catalyst such as ammonia or triethylamine or mixtures thereof are used, a composite material having excellent heat resistance and strength is obtained. When aromatic hydrocarbon resins such as toluene resins, xylene resins and mesitylene resins are used as a modifier, the proportion of phenolic hydroxyl group in resins which shows poor resistance against an alkali is reduced and therefore alkali resistance can be improved. It is preferred that these so-called aromatic hydrocarbon resin-modified phenolic resins have percent modification of aromatic hydrocarbon resin of from 5 to 50% by weight (the percent modification refers to the proportion of aromatic hydrocarbon resin to resin solid content). If the percent modification is less than 5% by weight, a modification effect will be insufficient. If the percent modification is more than 50% by weight, an effect obtained by the phenolic resin will be insufficient and heat resistance and strength will be reduced.

Furan resins used in the present invention include furfuryl alcohol resins and furfuryl alcohol resins modified with modifiers such as furfural, formaldehyde, phenol, urea and mixture thereof.

These phenolic resins or furan resins are usually used in the form of a liquid in the present invention. In the case of the form of a solid, the solid is cutbacked with solvents such as alcohols and ketones. When a liquid resin is used, the liquid resin can be diluted with these solvents in order to increase compatibility with the inorganic fibers or heat-resistant organic fibers in the form of a long fiber bundle.

Such phenolic resin or furan resins usually have a tensile elongation of about 2% and are suitable as a firm fiber-reinforcing agent. However, such resins have small elongation and thus are brittle. The elongation and ultimate force of the resin can be improved by using short fibers having a length of 600 micrometers and a diameter of 15 micrometers. In increase elasticity, a portion of the phenolic resin or the furan resin (less than about 50%, preferably less than 30%) can be replaced by another resin selected from highly elastic resins such as epoxy resins, acrylic resins, amino resins, urethane resins, Teflon resins, silicone resins, nylon resins, vinyl chloride resins, vinyl ester resins, polyethylene resins, and mixtures thereof. Such optional resins may be in the form of a powder or liquid. These optional resins have high resistance to chemicals. The incorporation of these resins can improve acid resistance and alkali resistance. Even if these resins are used in combination, the heat resistance is good.

A filler is added together with such heat-resistant resins in order to retain strength and to improve heat resistance. The presence of this filler prevents the resin from excessively flowing between fibers and fixes the resin. Thus, interconnection between fibers can be improved, thereby preventing oxygen from penetrating into spaces present between fibers. A filler selected from refractory fines, inorganic short fibers, aluminum phosphate powder and mixtures thereof is used. Examples of the refractory fines for use herein include various fines such as alumina fines, silica fines, magnesia fines, Portland cement, alumina cement, blast furnace slag cement and fly ash. Examples of hydrated refractories include various fines such as magnesium hydroxide and aluminum hydroxide.

Because the phenolic resin at the surface of the matrix is converted to densified glassy carbon during the heating process, the hydrated refractories such as magnesium hydroxide and aluminum hydroxide release the contained moisture of OH groups through the glassy carbon during the heating process at temperatures of about 480° C. and about 320° C., respectively. The endothermic reaction retards the temperature increase of a reinforcing member composed of the fibers and the filler, and the heat resistance is improved. The presence of the resin described above raises the release temperature by 30° C.–20° C.

When alumina cement, Portland cement, blast furnace slag cement or the like is used as the filler, the present alcohol-soluble phenolic or furan resins containing substantially no water can provide an economically inexpensive composite material. When this composite material containing the resin and cement is heated, the heat resistance is good (particularly when alumina cement is used) and the alkali resistance is generally also good. These refractory fines, usually have a size of from 1 to 100 micrometers, preferably from 1 to 50 micrometers. When refractory fines having a size of less than 10 micrometers are used, these fines must be previously coated with the heat-resistant resin before use.

In addition to the refractory fines, inorganic short fibers can also be used. Examples of the short fibers include glass fibers, carbon fibers, and alumina fibers or these combination having a length of no more than 600 micrometers and a diameter of no more than 22 micrometers. In addition, aluminum phosphate powder can also be used as the filler; it can act as a binder or curing agent; and it can improve alkali resistance.

While heat resistance, elongation at tensile load, ultimate force and alkali resistance can be improved by adding refractory fines as the filler, use of a combination of the refractory fines and aluminum phosphate or aluminum phosphate alone as the filler is effective. In the case of a solvent-containing resin of the present invention, the strength of fibers is not reduced at all in steps of drying and heating the reinforcing long fibers even if aluminum phosphate having a pH of as low as 3 is used. When the composite material is heated to above 300° C., the OH group in the resin reacts with $P_2O_5$ derived from aluminum phosphate to inhibit harmful fuming, and the ignition and combustion of a decomposed gas can be prevented. Thus, the percent residual carbon after combustion of the volatile matter of the resin is improved. Further, aluminum phosphate can act as a curing agent during the heating process to form a firm fiber-reinforced product.

Thus, the use of aluminum phosphate powder alone or in combination with refractories improves a percent residual carbon in air at a temperature of from 300° C. to 700° C. and inhibits the evolution of a harmful gas during the heating process.

Such heat-resistant resins and fillers are used in such amounts that the solid content of the resin and the filler are in the range of from 10 to 90% and 10 to 90% of the total amount of the resin solid content and the filler, respectively. It is particularly preferred that the resin (solid matter) is used in an amount in the range of from 30 to 70% of the total amount and the filler is used in an amount in the range of from 30 to 70% of the total amount. When a large amount of the filler is used in the amount in the range described above and the amount of the resin is reduced, the evolution amounts of combustible gases of the resin (such as hydrogen, methane and carbon monoxide) are reduced and the increase of the temperature of the composite material of the present invention is inhibited. Accordingly, carbonization of the resin can be prevented and the heat resistance can be obtained. The resin can withstand heating at 300° C., even at 700° C. for at least one hour.

It is desirable that when the size of the filler is no more than 10 micrometers, particularly no more than 1 micrometer, the filler is previously coated with a small amount of a resin. For example, 100 parts of alumina fines, 10 parts of an alcohol solvent and 0.7 parts of a resol-type phenolic resin are mixed and the alcohol is evaporated. Thereafter, the mixture is heated and dried and heated to 180° C. for 3 minutes to form coated alumina fines. These coated alumina fines are used. In coating, a novolac-type phenolic resin can be used in place of the resol-type phenolic resin. Alternatively, the novolac-type phenolic resin can be used in combination with the resol-type phenolic resin.

In addition to such fillers, various binders can be used in the present invention. For example, the addition of sodium silicate, potassium silicate or lithium silicate can increase the refractoriness of the resin as described above. This can prevent the release of its combustible gas components during the heating process.

In order to increase heat resistance and bonding force, colloidal silica and silica sol can be added. Colloidal silica has a pH of from 2 to 4 and has an OH group at the surface of the particle. It is believed that the OH group be crosslinked and polymerized with an OH group of a phenolic resin or an OH group of an alcohol solvent during the heating process to form a firm composite material. Silica sol is suitably added when resins such as epoxy resins and acrylic resins are used in combination with the phenolic resins.

When the furan resin is used, an organic acid such as toluene sulfonic acid, xylene sulfonic acid or sulfamic acid, or an inorganic acid such as phosphoric acid, hydrochloric acid or sulfuric acid is used as a curing agent. When the phenolic resin is used, the curing agent may be used for the purposes of curing at lower temperature reduction and curing in shorter time.

A blend comprising the resin solid matter, the filler and the optional binder is incorporated in the base long fibers in a ratio of the above long fibers to the above blend of about 1:0.5 to 1:4. The blend described above is used in an amount of from about 30 to 80% based on the total amount of the long fibers and the blend.

A composite material of the present invention is prepared as follows. First, a slurry containing a solvent-containing resin and a filler is prepared, and long fibers are immersed in the slurry. The mixture is formed into a molded product by means of a roll, and the molded product is heated and dried for 2 hours at a temperature of from about 60° C. to 80° C. to drive out the solvent. Thereafter, the temperature is increased to a temperature of from about 120° C. to 180° C. and the molded product is heated for one hour and fired to obtain the composite material according to the present invention.

Processes for producing a composite material are as follows:

(i) Each roving (800–2,300 filaments) is impregnated into a specific blend. Thereafter, rovings are formed into a required shape of 5–100 rovings without drying, and then dried and heated.

(ii) Filaments are impregnated into a specific blend, and then dried and formed into each roving of 800–2,300 continuous filaments and the roving is heated. The rovings are formed into a required shape of 5–100 rovings and heated.

(iii) Each roving (800–2,300 filaments) is impregnated into a specific blend, dried and heated. The rovings are formed into a required shape of 5–24 rovings, dried and heated.

The blend of the resin and the filler present in the composite material according to the present invention is retained at high temperatures to examine the change of a percent residual carbon. The results are shown in a graph of FIG. 1. This graph is obtained by plotting the percent residual carbon when the temperature of a blend composed of a resol-type phenolic resin (solid content of 50% by weight) and 50% of alumina fines as the filler is gradually increased under nitrogen blanket. A combustile gas begins to release at a heating temperature of 250° C., the weight loss of 3% is observed at 300° C. and the weight loss of 12.5% by weight is observed at 400° C. Accordingly, 87.5% of the resin content remains even at 400° C. and the strength is reduced by only about 20%. When the composite material of the present invention is used as a composite material for construction structure, it has sufficient heat resistance and strength.

Generally, the composite material according to the present invention is embedded in a concrete structure having a thickness of from 10 to 30 cm. Even if this structure is heated to above 300° C., a carbonization product of the resin is completely tarry, and the evolution of harmful gases and their combustion do not occur. Strength can be maintained up to 700° C. While glass fibers and carbon fibers in the form of continuous fibers begin to be oxidized at 300° C. in air, heat resistance at 300° C. is imparted by the resin, refractoriness is increased by fillers such as refractory fines, and the heat resistance is increased by aluminum phosphate powder. Thus, even if any long fibers are used, the heat resistance of the present invention is sufficient.

The composite material of the present invention has high corrosion resistance, particularly high alkali resistance, light weight and large strength. The composite material of the present invention can be mass produced in a factory. For example, the tensile strength and specific strength of the present composite material are 2 times and 6-7 times those of steel, respectively.

Thus, the composite material of the present invention has excellent heat resistance, corrosion resistance (alkali resistance) and strength. The composite material of the present invention can be effectively used as a substitute for reinforcing steel bars for concrete structure reinforcement, as a substitute for strands for prestress concrete structures, as a substitute for steel frame, of as an interior or exterior finish material for non-structures. Examples of the concrete structures include structures for various uses. For example, the present composite material can be used in footings, columns and floors of general buildings; and basement piles, building footings, exterior walls, columns, floors and basements of high-rise buildings. The composite material of the present invention can also be used in various structures, for example, civil engineering structures such as roads, tunnels, petroleum base footings, airport runways, station platforms and port concrete shore protection structures; and ships.

EXAMPLE 1

The following materials were used. Rovings of glass fibers were impregnated into a mixture, and heated for 2 hours at 60° C. and then for one hour at 120° C. to obtain a composite material of the present invention.

(i) Glass Fiber (Continuous Fiber)
  Diameter: 22 micrometers
  Weight: 2,220 g/1000 m
  Tensile strength: 200 kg/mm$^2$
  Component (%) SiO$_2$ 54; Al$_2$O$_3$ 15; CaO 14; B$_2$O$_3$ 5

A roving was obtained by bundling 2,300 filaments. The ultimate load at tension obtained by calculating the cross-sectional area of the fibers is 174.76 kg.

The glass fibers were impregnated into a solution comprising TSL-8331 silane coupling agent manufactured by Toshiba Silicone Co., Ltd. and 1% of CMC as a binder, and thereafter dried at 100° C., (ii) Phenolic Resin A The resol-type phenolic resin synthesized by reacting phenol and 37% formalin in the presence of an ammonia catalyst in a molar ratio (F/P) of 1.2, dehydrating and diluting with methanol.

Specific gravity (25° C.) 1,055 Viscosity (25° C.) 1.5 poises Solid content (135° C., one hour) 58% by weight (iii) Aluminum hydroxide

| Al(OH)$_3$ | 99.8% |
|---|---|
| Mean particle size | 25 micrometers |
| Al$_2$O$_3$ | 65.4% |
| H$_2$O | 34.6% |

(iv) Magnesium hydroxide

| Mg(OH)$_2$ | 96% |
|---|---|
| Mean particle size | 1 micrometer |
| H$_2$O | 32.1% |

Magnesium hydroxide (1 micrometer) was previously coated with the following composition.

| Phenolic Resin A | Methanol | Magnesium hydroxide (1μ) |
|---|---|---|
| 5 | 10 | 100 |

A slurry having the following composition was used (%).

| Test No. | Phenolic Resin A | Aluminum Hydroxide (25μ) | Coated Magnesium hydroxide (1μ) | Methanol |
|---|---|---|---|---|
| 1 | 90 | 10 | | |
| 2 | 80 | 10 | | 10 |
| 3 | 70 | | 30 | |

Reinforcing components of Test Pieces; Proportions of Phenolic Resin Solid Content and Filler (%)

| Test No. | Phenolic Resin solid content | Filler |
|---|---|---|
| 1 | 83.9 | 16.1 |
| 2 | 82.2 | 19.8 |
| 3 | 57.5 | 42.5 |

The ultimate load, elongation and heat resistance (in a furnace for one hour) of the test pieces were as follows:

| Test No. | Ultimate load (kg) | Elongation at ultimate load (mm) | Heat resistance (°C.) |
|---|---|---|---|
| 1 | 130 | 7.2 | 380 |
| 2 | 160 | 10.2 | 420 |
| 3 | 145 | 8.8 | 430 |

The test pieces were obtained by impregnating a roving of 2,300 filaments in the slurry described above, drying and setting.

The test pieces having a length of 620 mm were tested for ultimate load and elongation at tension by means of a tension testing machine.

Heat resistance exhibits such a property that combustion and the deterioration of the samples do not occur after an electric furnace was retained for one hour at a predetermined temperature.

Heat resistance at air exhibits such a property that the composite material does not show ignition, combustion and incineration after the composite material was heated for one hour at a predetermined temperature and that the composite material has high strength after heating. The ultimate load of the test pieces Nos. 1 through 3 exceeded a predetermined target 125 kg. The ratio of the dry total weight of the phenolic resin and the filler to weight of continuous fibers was 2:1.

EXAMPLE 2

The glass fiber roving described in Example 1 were used and the following slurry was used. Slight pressure was applied during the drying process to prepare a composite material of the present invention.

Drying and setting conditions were the same as those of Example 1.

Phenol resin-coated magnesium hydroxide

-continued

| Test No. | Phenolic Resin A | Alumina (4.6μ) | Magnesia (35μ) | Alumina (0.6μ) | 2% of phenolic resin | 5% of phenolic resin |
|---|---|---|---|---|---|---|
| 4 | 50 | 50 | | | | |
| 5 | 18 | | 82 | | | |
| 6 | 60 | | | | 40 | |
| 7 | 60 | | | | 20 | 20 |
| 8 | 60 | | | 40 | | |

Proportions of Phenolic Resin Solid Content and Filler of Test Pieces (%)

| Test No. | Phenolic Resin solid content | Filler |
|---|---|---|
| 4 | 36.7 | 63.3 |
| 5 | 11.3 | 89.7 |
| 6 | 46.5 | 53.5 |
| 7 | 46.5 | 53.5 |
| 8 | 46.5 | 53.5 |

The ultimate load, elongation at ultimate load and heat resistance of the test pieces were as follows:

| Test No. | Load at ultimate (kg) | Elongation (mm) | Heat resistance (°C.) (× one hour heating) |
|---|---|---|---|
| 4 | 126 | 6.4 | 400 |
| 5 | 93 | 4.7 | 430 |
| 6 | 140 | 8.6 | 410 |
| 7 | 155 | 9.5 | 420 |
| 8 | 110 | 5.4 | 320 |

Magnesium hydroxide was previously coated with Phenolic Resin A wherein the solid content of the Phenolic Resin A was 2% by weight or 5% by weight.

The test piece of Test No. 7 was heated to 300° C. and subjected to tension by means of a tension testing machine. The strength at high temperatures was lower than that at room temperature by 10%. Because the test piece is protected by the phenolic resin coated onto the surface of the glass fibers, the reduction of hot strength is small.

In Test No. 8, alumina having an average diameter of 0.6 micrometers and having no precoating was used. The ultimate load is low and the heat resistance is poor. This is because the strength of the composite material is low.

EXAMPLE 3

The following carbon fiber bundles were used in place of the glass fibers described in Example 1, impregnated in the following slurry, dried and set under the same conditions as those described in Example 1 to obtain a composite material of the present invention.

Carbon Fiber

| Density | 1.77 |
|---|---|
| Tensile strength | 350 kg/mm² |
| Tow | 12,000 filament |
| Tensile strength | 150 kg/each tow |

Phenolic Resin B

The resol-type phenolic resin synthesized by reacting phenol and 37% formalin in a molar ratio (F/P) of 0.9 in the presence of a sodium hydroxide catalyst and thereafter dehydrating.

Specific gravity (25° C.) 1,208 Viscosity (25° C.) 25 poises Solid content (135° C., one hour) 75% by weight Slurry

| Test No. | Phenolic Resin B | Silica powder (5μ) | Alumina (4.6μ) | Sodium silicate powder No. 1 |
|---|---|---|---|---|
| 9 | 48 | 49 | | 3 |
| 10 | 50 | | 50 | |

The proportions of phenolic resin solid content and filler were as follows (%):

| Test No. | Phenolic Resin solid content | Filler |
|---|---|---|
| 9 | 40.9 | 59.1 |
| 10 | 42.9 | 57.1 |

The ultimate load, elongation and heat resistance of the test pieces were as follows:

| Test No. | Ultimate load (kg) | Elongation at ultimate load (mm) | Heat resistance (°C.) (one hour retention) |
|---|---|---|---|
| 9 | 155 | 10 | 500 |
| 10 | 160 | 9 | 700 |

EXAMPLE 4

The glass fibers described in Example 1 were used and the following slurry was used. Drying and setting were carried out under the same conditions as described in Example 1 to obtain a composite material of the present invention, A thermosetting resin used was a combination heat-resistant Phenolic Resin A which withstands heating to 300° C. with an epoxy self-curing resin having large modulus of elasticity and corrosion resistance (acid resistance and alkali resistance). The heat resistance is substantially the same as that of Phenolic Resin A alone.

Epoxy Resin

| | Self-curing agent epoxy resin (A) | Epoxy resin (B) |
|---|---|---|
| Bulk specific gravity | 1.03 | 1.02 |
| Solid content (%) | 60 | 100 |
| Solvent (%) | 40 | |

Slurry (%)

| Test No. | Phenolic Resin A | Epoxy (A) | Epoxy (B) | Silica powder | Alumina hydroxide (1μ) | Alumina hydroxide (25μ) | Methanol |
|---|---|---|---|---|---|---|---|
| 11 | 31 | 16 | 7 | 32 | | | 14 |
| 12 | 57 | | 6 | | 25 | 6 | 6 |
| 13 | 26 | 10 | 6 | 50 | | | 8 |

The proportions of resin solid content and filler were as follows (%):

| Test No. | Resin solid content | Filler |
|---|---|---|
| 11 | 52.0 | 48.0 |
| 12 | 55.8 | 44.2 |
| 13 | 35.1 | 64.9 |

The ultimate load, elongation at ultimate load and heat resistance were as follows:

| Test No. | Ultimate load (kg) | Elongation at ultimate load (mm) | Heating temperature (°C.) (one hour heating) |
| --- | --- | --- | --- |
| 11 | 165 | 9.6 | 360 |
| 12 | 138 | 8.3 | 400 |
| 13 | 140 | 8.6 | 340 |

The glass fibers were impregnated in a solution containing 1% of TSL 8350 manufactured by Toshiba Silicone Co., Ltd. as a coupling agent and 1% of Phenolic Resin A, dried at 120° C. and set.

EXAMPLE 5

The type of continuous fibers and drying and setting conditions were the same as those described in Example 1. The following Furan Resin C alone or a combination of Furan Resin C with Phenolic Resin A was used as a resin. Furan Resin C The furan resin synthesized by reacting furfuryl alcohol in the presence of a sulfuric acid catalyst, dehydrating and thereafter diluting with furfuryl alcohol, furfural and methanol.

Specific gravity (25° C.) 1,206 Viscosity (25° C.) 1.5 poises Solid content (135° C., one hour) 54% by weight The following slurry was used.

| Test No. | Furan Resin C | Phenolic Resin A | Alumina (4.6μ) | Curing agent for furan resin (toluene sulfonic acid) | Methanol |
| --- | --- | --- | --- | --- | --- |
| 14 | 28 |    | 62 | 1 | 9 |
| 15 | 25 | 25 | 40 | 1 | 9 |
| 16 | 83 |    | 10 | 1 | 6 |

The proportions of resin solid content and filler were as follows (%):

| Test No. | Resin solid content | Filler |
| --- | --- | --- |
| 14 | 20.8 | 79.2 |
| 15 | 42 | 58 |
| 16 | 82.8 | 17.2 |

The ultimate load, elongation at ultimate load and heat resistance of test pieces were as follows:

| Test No. | Ultimate load (kg) | Elongation at ultimate load (mm) | Heating temperature (°C.) (one hour) |
| --- | --- | --- | --- |
| 14 | 128 | 6.8 | 410 |
| 15 | 141 | 8.7 | 430 |
| 16 | 166 | 9.5 | 400 |

EXAMPLE 6

The type of continuous fibers and drying and setting conditions were the same as those described in Example 1, and the following Phenolic Resin D was used as a resin.

(i) Phenolic Resin D

The resol-type phenolic resin modified with a xylene resin (percent modification of 20%) and containing methanol as a solvent.

Specific gravity (25° C.) 0,987 Viscosity (25° C.) 0.1 poises Solid content (135° C., one hour) 43% by weight (ii) Special Acidic Aluminum Phosphate Powder ALP 803 manufactured by Mitsui Toatsu Chemicals Inc $P_2O_5$ 51.8%; $Al_2O_3$ 18.5; pH 2.7; Ignition loss 32.3% A slurry was as follows (%):

| Test No. | Phenolic Resin D | Alumina (4.6μ) | Magnesia (35μ) | Alumina short fiber | ALP803 curing agent | Methanol |
| --- | --- | --- | --- | --- | --- | --- |
| 17 | 57 | 40 |    | 1 | 2 |    |
| 18 | 70 | 30 |    |   |   |    |
| 19 | 40 |    | 21 | 9 | 17 | 13 |
| 20 (Comp. Ex.) | 100 |    |    |   |   |    |

The proportions of phenolic resin solid content and filler were as follows (%):

| Test No. | Phenolic resin solid content | Filler |
| --- | --- | --- |
| 17 | 38.0 | 62.0 |
| 18 | 50.0 | 50.0 |
| 19 | 26.8 | 73.2 |
| 20 | 100 | — |

The test piece of Test No. 18 was heated for one hour in an electric furnace at 700° C. in such a state that the test piece was embedded in concrete (depth of 30 mm), slowly cooled, removed from the electric furnace, and a tensile test was carried out at room temperature by means of a tension testing machine. The strength of the test piece which had been heated was 80% of the strength of a test piece at room temperature. The phenolic resin was converted to glassy carbon when it was heated in a concrete in such a state that air circumstance was few, and the resin covered the surface of filaments to form a composite material having highly composite characteristics. Such a composite material is ceramic which has never been present in the prior art and thus constitutes a novel invention.

The ultimate load, elongation at ultimate load and heat resistance of the test pieces were as follows:

| Test No. | Ultimate load (kg) | Elongation at ultimate load (mm) | Heating temperature (°C.) (one hour heating) |
| --- | --- | --- | --- |
| 17 | 150 | 12.0 | 440 |
| 18 | 185 | 17.0 | 460 |
| 19 | 139 | 10.8 | 480 |
| 20 | 120 | 8.0 | 320 |

As can be seen from the foregoing, the composite material of Test No. 18 obtained by using a matrix material composed of 50% of alumina as a filler and 50% of a resin exhibits an ultimate load 1.54 times and an elongation at ultimate load 2.13 times the composite material of Test No. 20 composed of a resin alone and containing no filler. Thus, strong tensile strength can be obtained by using the filler in the present invention.

EXAMPLE 7

The solvent-containing Phenolic Resin D of the present invention and alumina cement as a filler were used to prepare the following slurry, and the slurry was used to obtain a composite material of the present invention.

The continuous glass fibers described in Example 1 were used, and drying and setting were carried out under the same conditions as those described in Example 1. Alumina Cement Component (%)

| SiO$_2$ | 5 |
| Al$_2$O$_3$ | 50 |
| Fe$_2$O$_3$ | 5 |
| CaO | 39 |
| Specific gravity | 3.3 |
| Particle size | 88 micrometers residue on sieve 1% |

A slurry was as follows (%):

| Test No. | Phenolic Resin D | Alumina Cement | Methanol |
| --- | --- | --- | --- |
| 21 | 63 | 30 | 7 |

The proportions of phenolic resin solid content and filler were as follows (%):

| Test No. | Phenolic resin solid content | Filler |
| --- | --- | --- |
| 21 | 47 | 53 |

The ultimate load, elongation at ultimate load and heat resistance of the present product were as follows:

| Test No. | Ultimate load (kg) | Elongation at ultimate load (mm) | Heating temperature (°C.) (one hour heating) |
| --- | --- | --- | --- |
| 21 | 140 | 8.6 | 450 |

EXAMPLE 8

While aramid fibers are not inorganic, they have good heat resistance and withstand 300° C. Accordingly, the aramid fibers are suitable as fibers for a composite material of the present invention.

Kevlar 49 manufactured by E. I. du Pont de Nemours & Co. was used as aramid fibers to prepare the present product.

Density 1.45 Tensile strength 280 kg/mm$^2$ Elongation at ultimate load 2.4%

A roving was obtained by bundling 11,400 filaments each having a diameter of 11.9 micrometers, and tested. Slurry Composition (%)

| Test No. | Phenolic Resin A | Aluminum hydroxide 1μ | 25μ |
| --- | --- | --- | --- |
| 22 | 50 | 40 | 10 |

The proportions of phenolic resin solid content and filler were as follows (%):

| Resin solid content | Aluminum hydroxide |
| --- | --- |
| 36.7 | 63.3 |

The ultimate load and elongation at ultimate load of the present product were as follows:

| Test No. | Ultimate load (kg) | Elongation | Heating temperature (°C.) (one hour heating) |
| --- | --- | --- | --- |
| 22 | 320 | 20 | 350 |

EXAMPLE 9

A composite material prepared from a slurry shown in the following Table 1 was impregnated for 48 hours in a 10% solution of sodium hydroxide, washed with water, and dried at 150° C. Weight change was determined to carry out an alkali resistance test.

The continuous fibers described in Example 1 were used and each slurry was used to prepare a test piece.

Drying and setting were carried out by heating for 2 hours at 60° C. and for one hour at 150° C.

When the Phenolic Resin A and the filler were used, the more the phenol resin is, the better the alkali resistance is. While MgO is a good filler, SiO$_2$ is a less preferable filler. For comparison, various products are shown in Table 1. Test No. 12 demonstrates a composite material composed of Phenolic Resin A alone and containing no filler, and this composite material does not exhibit alkali resistance at all. Test No. 13 demonstrates a composite material wherein fibers are bound with Phenolic Resin D alone. Test No. 14 demonstrates a composite material wherein fibers are bound with Furan Resin C alone. The composite materials of Test Nos. 13 and 14 exhibit good alkali resistance.

One of features of the present invention resides in that alkali resistance can be obtained using all the phenolic resins when the filler of the present invention is selected.

TABLE 1

| | Slurry | | | | | | | | | | |
| | Resin | | | | Filler | | | | | | Residue after |
| | Phenolic | | | Furan | Al(OH)$_3$ | Mg(OH)$_2$ | MgO | Al$_2$O$_3$ | SiO$_2$ | | treating with 10% |
| No. | A | D | Epoxy | C | 55μ | 1μ | 10μ | 55μ | 20μ | Methanol | NaOH (%) | Remarks |
| --- | --- | --- | --- | --- | --- | --- | --- | --- | --- | --- | --- | --- |
| 1 | 62.5 | | | | | | 37.5 | | | | 100 | good alkali resistance |
| 2 | 62.5 | | | | | | | 37.5 | | | 98 | |
| 3 | 62.5 | | | | | | | | 37.5 | | 98 | |
| 4 | 52.6 | | | | | 31.6 | | | | 15.8 | 92 | |
| 5 | 57.1 | | | | | 34.3 | | | | 8.6 | 95 | |
| 6 | 52.6 | | | | 47.4 | | | | | | 63 | |
| 7 | 62.5 | | | | 37.5 | | | | | | 82 | |
| 8 | 80.6 | | | | 11.6 | | | | | 7.8 | 90 | |
| 9 | 52.6 | | | | | | 31.6 | | | 15.8 | 92 | |
| 10 | 42.3 | | 42.3 | | 7.7 | | | | | 7.7 | 100 | good alkali resistance |
| 11 | | 80.6 | | | 11.6 | | | | | 7.8 | 100 | good alkali resistance |
| 12 | 100 | | | | | | | | | | 20 | poor alkali resistance |
| 13 | | 100 | | | | | | | | | 100 | good alkali resistance |

TABLE 1-continued

| | Slurry | | | | | | | | | | |
|---|---|---|---|---|---|---|---|---|---|---|---|
| | Resin | | | | Filler | | | | | Residue after | |
| | Phenolic | | | Furan | Al(OH)$_3$ | Mg(OH)$_2$ | MgO | Al$_2$O$_3$ | SiO$_2$ | | treating with 10% | |
| No. | A | D | Epoxy | C | 55μ | 1μ | 10μ | 55μ | 20μ | Methanol | NaOH (%) | Remarks |
| 14 | | | | 100 | | | | | | | 100 | good alkali resistance |

As can be seen from the foregoing, according to the present invention, the mixture of the phenolic resin or furan resin and the inorganic filler is used as the matrix materials for the inorganic fibers or heat-resistant organic fibers in the form of the continuous fiber roving, whereby the composite materials for structure having excellent characteristics such as heat resistance, strength and alkali resistance can be obtained whereas composite materials having such excellent characteristics cannot be obtained in the prior art. The composite materials of the present invention can withstand a fire and cement attack and therefore the present invention can provide substitutes for reinforcing steel bars and steel frames which can be used in construction structures for buildings and civil engineering or the like. Thus, the present invention provides many benefits and advantages.

What is claimed is:

1. A composite material for concrete reinforcement comprising a matrix of a mixture of a resol-type phenolic resin produced by reacting a phenol with an aldehyde in the presence of a base catalyst, said resol-type phenolic resin being modified with an aromatic hydrocarbon resin having a degree of aromatic substitution of 5-50% by weight and an inorganic filler, said matrix incorporated in an inorganic fiber or heat-resistant organic fiber in the form of a continuous fiber roving, wherein said filler is selected from the group consisting of refractory fines, aluminum phosphate powder and mixtures thereof, wherein the solid content of said resin is present in an amount of from 30 to 70% by weight of the total amount of the resin solid content and the filler, and said filler is present in an amount of from 30 to 70% by weight of the total amount of the resin solid content and the filler and wherein the weight ratio of fiber to the matrix materials is from 1:0.5 to 1:4.

* * * * *